United States Patent [19]

Lapshansky

[11] Patent Number: 4,538,847
[45] Date of Patent: Sep. 3, 1985

[54] PIVOTABLE MULTIPLE SOCKET

[76] Inventor: John F. Lapshansky, 401 Terry Dr., Joliet, Ill. 60435

[21] Appl. No.: 629,375

[22] Filed: Jul. 10, 1984

[51] Int. Cl.³ .................. A01B 1/22; B25G 3/12; E01H 5/02
[52] U.S. Cl. .................. 294/51; 37/285; 294/53.5; 294/54.5; 294/57; 403/4
[58] Field of Search .................. 294/49, 51, 52, 53.5, 294/54.5, 57, 58; 16/110 R, 114 R; 37/265, 278, 284, 285; 172/372; 403/3, 4

[56] References Cited

U.S. PATENT DOCUMENTS

| | | | |
|---|---|---|---|
| 718,534 | 1/1903 | Shedd | 172/372 |
| 1,074,889 | 10/1913 | Moore | 294/58 |
| 1,191,810 | 7/1916 | Miller | 294/51 |
| 2,170,125 | 8/1939 | Caldwell | 294/52 |
| 2,429,753 | 10/1947 | Grosch | 403/4 |
| 2,919,153 | 12/1959 | Benton | 294/51 |

FOREIGN PATENT DOCUMENTS

| | | | |
|---|---|---|---|
| 874455 | 4/1953 | Fed. Rep. of Germany | 294/54.5 |
| 334379 | 12/1903 | France | 403/4 |
| 169263 | 5/1934 | Switzerland | 403/4 |

Primary Examiner—Johnny D. Cherry
Attorney, Agent, or Firm—Ernest Kettelson

[57] ABSTRACT

A pivotable multiple socket for shovels comprising a rotatable socket member to receive the end of a shovel handle, the socket member being in the form of an adapter which itself seats in and is removable from the permanently mounted socket of the shovel blade, in which the rotatable socket member can be rotated to a plurality of different working positions. The rotatable socket member includes a tubular insert to rotatably seat in the permanently mounted socket of the shovel blade, a first tubular socket to receive the end of the shovel handle in axial alignment with the tubular insert of the socket member, and a second tubular socket for receiving the end of the shovel handle which extends at an oblique angle from the longitudinal axis of the tubular insert portion of the socket member. The socket member in accordance with this invention permits positioning the shovel blade at different angles to the shovel handle, both vertically and horizontally.

10 Claims, 6 Drawing Figures

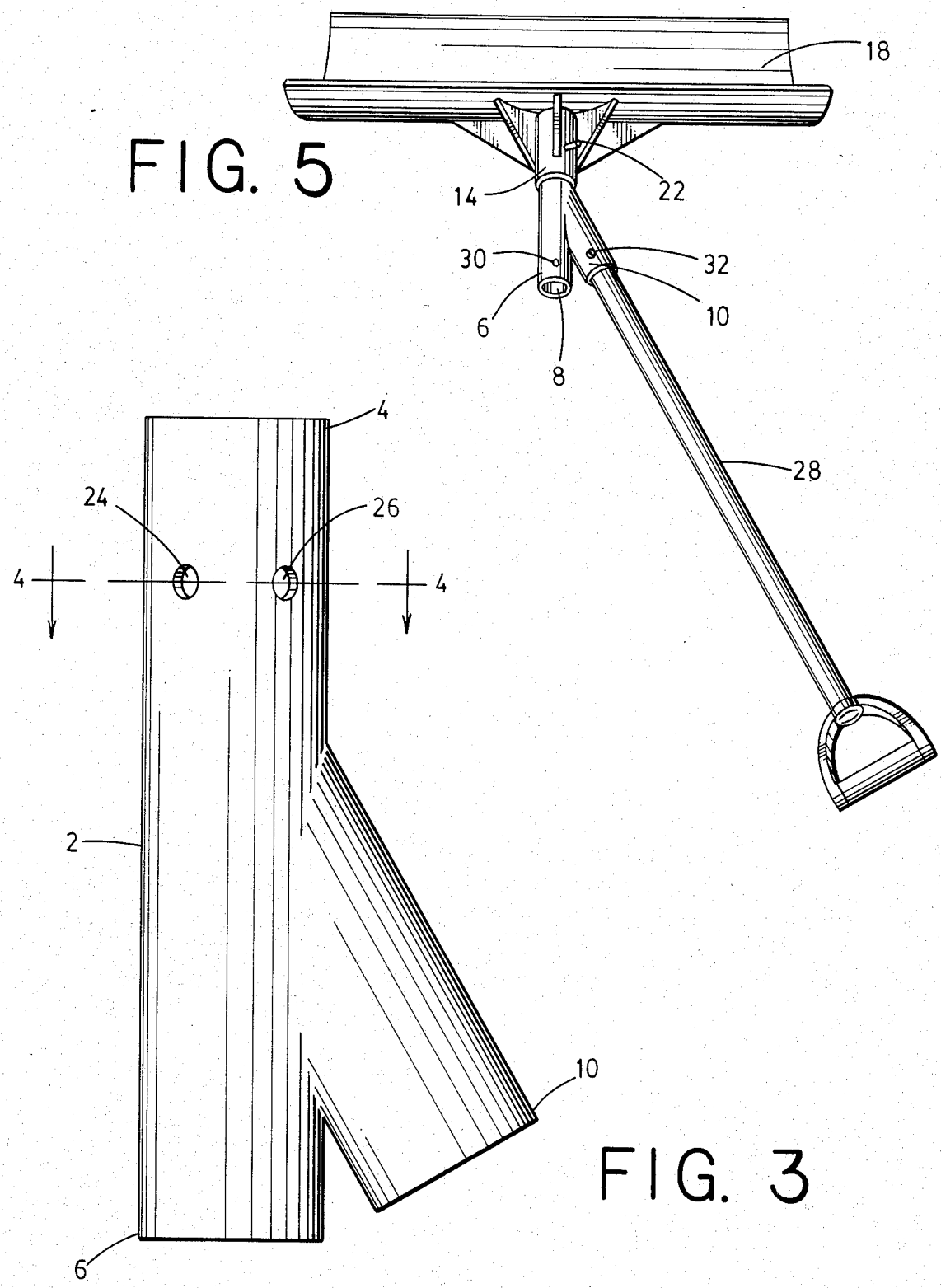

PIVOTABLE MULTIPLE SOCKET

BACKGROUND OF THE INVENTION

This invention relates to the field of hand shovels, in which the handle can be moved to different positions relative to the blade of the shovel.

Prior art devices of this kind have been able to position the handle at different fixed angles relative to the shovel blade in either the horizontal direction or the vertical direction but not both. The socket member in accordance with the present invention is able to position the handle at different angles relative to the blade in both the horizontal and vertical directions.

Some examples which are illustrative of the prior art include U.S. Pat. No. 4,264,096 which discloses a shovel having two handles, one in a fixed position and the other not fixed in any angular position but connected by an eye bolt to the blade or scoop for free swinging relationship therewith. U.S. Pat. No. 3,473,838 discloses a shovel having a handle which can be positioned at different angles to the blade in the vertical direction only. U.S. Pat. No. 2,463,150 discloses a snow shovel in which the handle can be rigidly held in a vertical plane relative to a horizontally extending blade, which includes a swing bar or clamping lever 27 that allows the handle to become free swinging relative to the blade when the clamping lever 27 is swung outwardly as shown in FIG. 4 of that patent. U.S. Pat. No. 3,222,699 discloses a shovel having a handle with a bend at an intermediate point thereon. It is connected to the blade at a permanently fixed angle. U.S. Pat. No. 1,074,889 discloses a shovel having an auxiliary handle extending forwardly of the shovel blade. U.S. Pat. No. 1,896,568 discloses a digging instrument, comprising a shovel on one end and a fork or rake type tool on the other end, connected to the handle by a pivotable member which enables rotating the digging instrument so the shovel end is in the working position axially aligned with the handle and when rotated one hundred eighty degrees the fork or rake end is in the working position axially aligned with the handle.

SUMMARY OF THE INVENTION

It is an object of the invention to provide a pivotable multiple socket member for shovels wherein the shovel can be used as a scoop when the handle is in one angular position relative to the blade and as a dozer when the handle is moved to a different angular position relative to the blade.

It is an object of the invention to provide a pivotable mulitple socket member for shovels wherein the handle can be positioned at different angles to the blade in both the horizontal and vertical directions.

BRIEF DESCRIPTION OF THE DRAWING

FIG. 3 is an enlarged plan view of the pivotable multiple socket member in accordance with this invention.

FIG. 5 is a plan view of a shovel having a multiple socket member connected thereto, rotated to the position wherein its diagonal socket extends rearwardly at a diagonal toward the right, for use as a dozer.

DESCRIPTION OF PREFERRED EMBODIMENT

Figure 1:
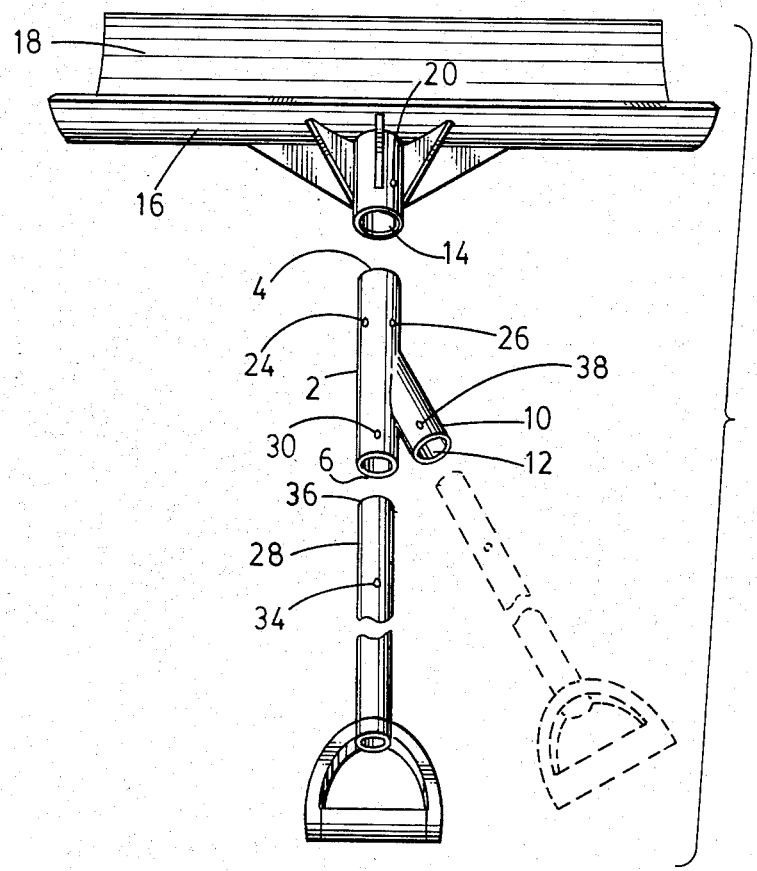
FIG. 1 is an exploded plan view of a pivotable multiple socket member for a shovel in accordance with this invention, showing it in position for connection at one end to a shovel blade and to a handle at its other end.
Figure 2:
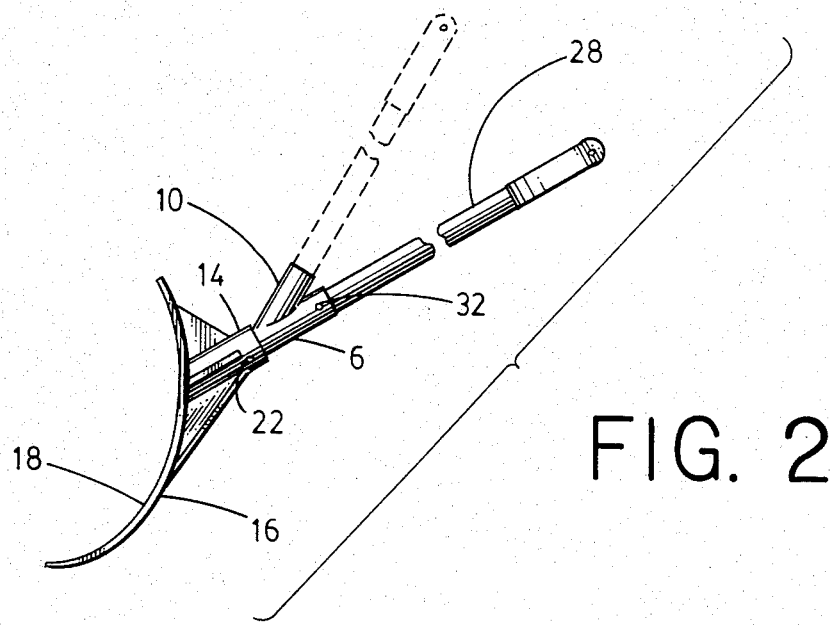
FIG. 2 is a side elevation view of the pivotable multiple socket member for a shovel as shown in FIG. 1 but with the socket member connected to the shovel blade and the handle connected to the socket member, showing in phantom by broken lines a handle connected to the diagonally extending socket of the multiple socket member, the socket member being rotated to the position wherein the diagonally extending socket extends vertically above the rearwardly extending socket which is axially aligned with the socket that is permanently attached to the blade.
Figure 6:
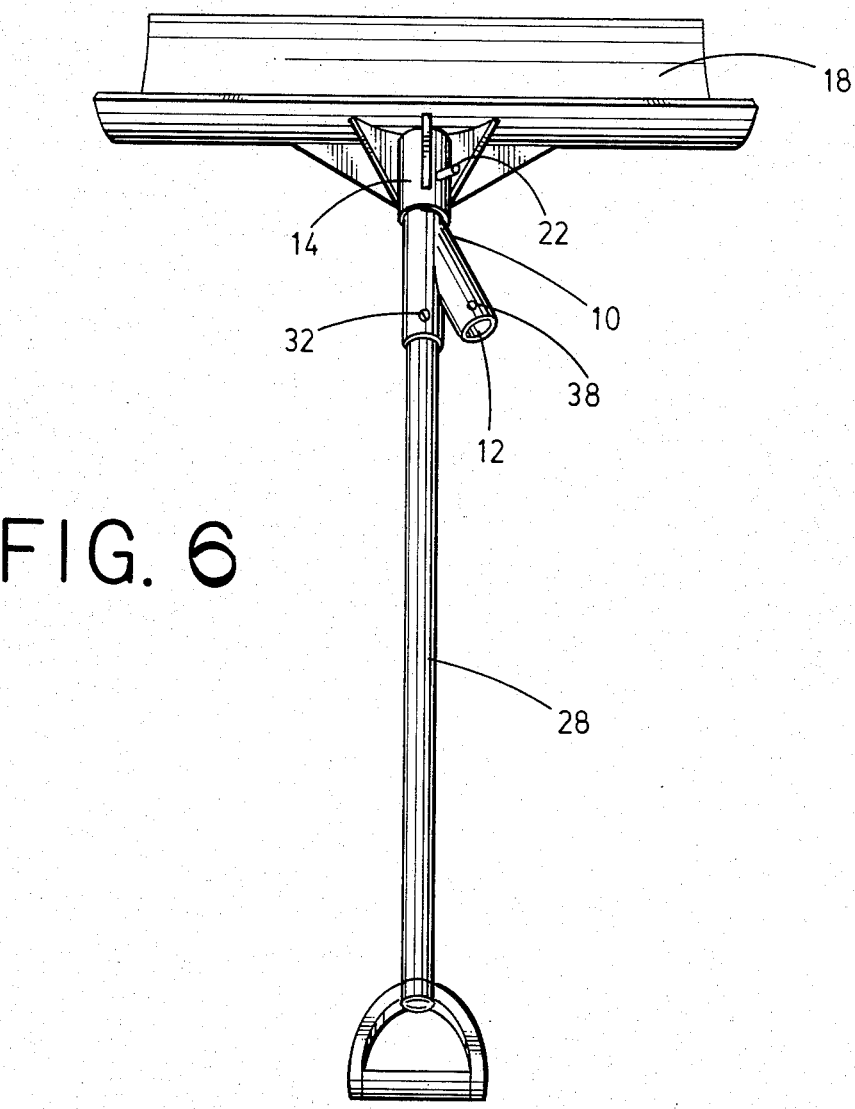
FIG. 6 is a plan view of a shovel having a multiple socket member in accordance with this invention showing the handle seated in the rearwardly extending socket which is axially aligned with the permanently connected socket of the shovel blade.
Figure 4:
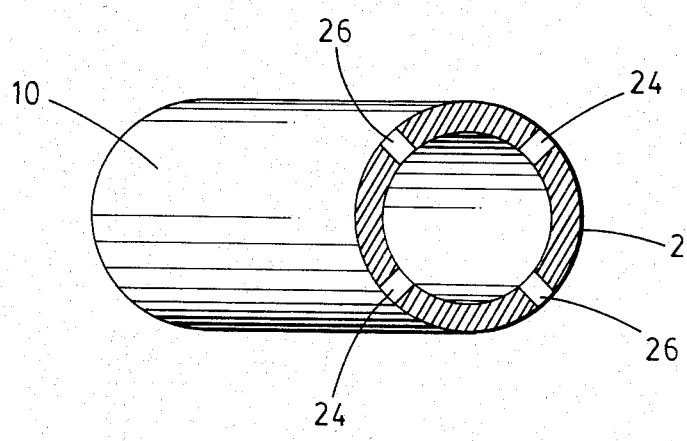
FIG. 4 is a section view taken on line 4—4 or FIG. 3.

A pivotable multiple socket member for shovels, comprising an elongated tubular body 2 having an insert end 4 and a handle receiving end 6. The handle receiving end 6 comprises a socket cavity 8 which is axially aligned with the insert end 4. A second handle receiving socket 10 extends at an oblique angle from the tubular body 2, having a socket cavity 12 which extends at an oblique angle to the longitudinal axis of the insert end 4 and its axially aligned socket cavity 8.

The insert end 4 of the socket member has a cross-sectional dimension and configuration to rotatably seat in the permanently mounted socket 14 affixed to the rear wall 16 of the shovel blade 18. The permanently mounted socket 14 includes a pair of diametrically opposed apertures 20 to receive a retaining pin 22 therethrough. The insert end 4 of the socket member includes two pairs of diametrically opposed apertures 24 and 26, which sequentially come into registration with apertures 20 of socket 14 when the insert end 4 is inserted into socket 14 and rotated to a first position in which the second handle receiving socket 10 is in vertical angular alignment with the horizontally extending blade 18 wherein apertures 24 of the insert end 4 are in registration with apertures 20 of the socket 14, and to a second position in which the second handle receiving socket 10 is in horizontal angular alignment with the blade 18 and apertures 26 of the insert end 4 are in registration with apertures 20 of the socket 14.

A handle 28 is inserted into either socket cavity 8 or 10, depending on how the shovel is to be used.

When the insert end 4 of the socket member is inserted into the permanently mounted socket 14 of the shovel blade 18, and rotated to the first position in which apertures 24 of the insert end 4 are in registration with apertures 20 of socket 14, the handle 28 can be inserted into the first handle receiving socket 8 for use at a relatively greater vertical angle relative to the blade 18 or in the second handle receiving socket 10 for use at a relatively smaller vertical angle relative to the blade 18. When the insert end 4 of the socket member is rotated to the second position in which apertures 26 of the insert end 4 are in registration with the apertures 20 of the socket 14, the second handle receiving socket 10 is positioned at a horizontal angle to the blade 18. The handle 28 can be inserted in socket 10 in such position, and the handle 28 is then positioned relative to the blade 18 wherein the shovel can be used as a dozer. In other words, the blade 18 is at an oblique angle to the handle 28, whereby when forward pressure is applied to the handle 28 the blade 28 moves at an oblique angle to whatever is being pushed such as snow on a sidewalk. The shovel in this position can be used as a dozer.

An aperture 30 is provided through the side wall of the first handle receiving socket 6 opening to the socket cavity 8, to receive a set screw 32 therethrough for seating in a corresponding aperture 34 in the insertable end 36 of the handle 28 when inserted in the socket cavity 8 until the handle aperture 34 is in registration with the socket aperture 30. The set screw 32 thus holds the handle 28 securely in socket 6 until it is desired to remove the handle from that socket.

An aperture 38 is provided through the side wall of the second handle receiving socket 10 opening to the socket cavity 12. When the handle 28 is inserted in socket 10, the handle aperture 34 is brought into registration with the socket aperture 38 and set screw 32 is then seated through socket aperture 38 in the handle aperture 34 to hold the handle securely in the second socket 10 until it is desired to remove the handle from that socket.

The elongated tubular body 2 can be rotated a full three hundred and sixty degrees within the permanently mounted socket 14 of the shovel blade 18. Thus, the diagonally extending socket member 10 can be positioned either at a diagonal extending from the blade 18 rearwardly toward the right as shown in FIG. 5 of the drawing, and the tubular body 2 can be rotated one hundred and eighty degrees so the diagonally extending socket member 10 extends rearwardly from the blade 18 at a diagonal toward the left. In both positions, the diametrically opposed apertures 26 through the insert end 4 of the tubular body 2 are in registration with the corresponding apertures 20 through the wall of the permanently mounted socket 14. The retaining pin 22 can be inserted through such aligned apertures to hold the tubular member 2 in either of such positions. When the handle 28 is inserted in the diagonally extending socket 10, the blade 18 can be used as a dozer to angle the blade toward either the right or the left depending on which position the tubular body member 2 is rotated to as described above.

The permanently mounted socket 14 is affixed to the rear wall 16 of the blade 18 with the longitudinal axis of socket 14 extending at a right angle to the lateral direction of the blade 18, or at a right angle to a laterally extending plane in which corresponding side edges of the blade 18 lie.

The cavity of the permanently mounted socket 14 is cylindrical in cross-section and the insert end 4 of the elongated tubular body 2 is also cylindrical, and of such cross-sectional dimension that it seats snugly in the cavity of the socket 14 for rotation therein.

I claim:

1. A pivotable multiple socket for a shovel, comprising first socket means to receive the insertable end of a shovel handle, connection means to connect said first socket means to a shovel blade, said connection means including a longitudinal axis extending from a shovel blade at substantially a right angle to the lateral direction across said blade, said first socket means including a first socket cavity, said first socket cavity being axially aligned with said connection means when connected thereto, second socket means to receive the insertable end of a shovel handle, said second socket means including a second socket cavity being positioned on said pivotable multiple socket whereby its longitudinal axis extends at an oblique angle to the longitudinal axis of said first socket cavity, and rotation means operatively associated with said first socket means and said connection means whereby said pivotable multiple socket may be rotated on said longitudinal axes of said connection means and of said first socket means axially aligned therewith.

2. A pivotable multiple socket for a shovel as set forth in claim 1, wherein said pivotable multiple socket may be rotated three hundred and sixty degrees on said longitudinal axes.

3. A pivotable multiple socket for a shovel as set forth in claim 1, wherein said pivotable multiple socket may be rotated on said longitudinal axes between a first position in which said second socket cavity extends diagonally at a substantially vertical angle relative to said blade, a second position rotated ninety degrees in one direction from said first position, and a third position rotated ninety degrees in the opposite direction from said first position, said pivotable multiple socket enabling use of said blade as a dozer when said second socket cavity is rotated to said second and third positions and a said shovel handle is received therein.

4. A pivotable multiple socket for a shovel as set forth in claim 1, wherein said connection means includes a fixed socket member rigidly mounted on the back wall of a said shovel blade, said fixed socket member including a cylindrical cavity, said first socket means includes an insert end opposite from said first socket cavity, said insert end being cylindrical and corresponding in dimension to that of said cylindrical cavity of said fixed socket member for being snugly received therein and rotatable therein.

5. A pivotable multiple socket for a shovel as set forth in claim 4, wherein said first socket means and said insert end thereof comprise a first elongated tubular member.

6. A pivotable multiple socket for a shovel as set forth in claim 5, wherein said second socket means includes a second tubular member, said second tubular member being integrally connected to said first elongated tubular member at an oblique angle thereto.

7. A pivotable multiple socket for a shovel as set forth in claim 4, wherein said fixed socket member includes a pair of diametrically opposite apertures opening to said cylindrical cavity thereof, said cylindrical insert of said first socket means includes a first pair of diametrically opposite apertures therethrough, said pair of diametrically opposite apertures of said fixed socket member and said first pair of diametrically opposite apertures of said cylindrical insert being in registration with each other when said cylindrical insert of said first socket means is operably received in said cylindrical cavity of said fixed socket member, and a retaining pin for insertion through said apertures when in said registration with each other.

8. A pivotable multiple socket for a shovel as set forth in claim 7, wherein said cylindrical insert of said first socket member includes a second pair of diametrically opposite apertures circumferentially aligned with said first pair of apertures, said second pair of diametrically opposite apertures being angularly spaced apart from said first pair of apertures.

9. A pivotable multiple socket for a shovel as set forth in claim 8, wherein said first pair of diametrically opposite apertures of said cylindrical insert of said first socket means is in registration with said diametrically opposite apertures of said fixed socket member when said second socket cavity extends diagonally from said blade in a substantially vertical angle thereto when the lateral dimension of said blade is positioned to extend horizontally.

10. A pivotable multiple socket for a shovel as set forth in claim 9, wherein said second pair of diametrically opposite apertures of said cylindrical insert of said first socket means is in registration with said diametrically opposite apertures of said fixed socket member when said second socket cavity extends diagonally from said blade in a substantially horizontal angle thereto when the lateral dimension of said blade is positioned to extend horizontally.

* * * * *